Patented Dec. 5, 1922.

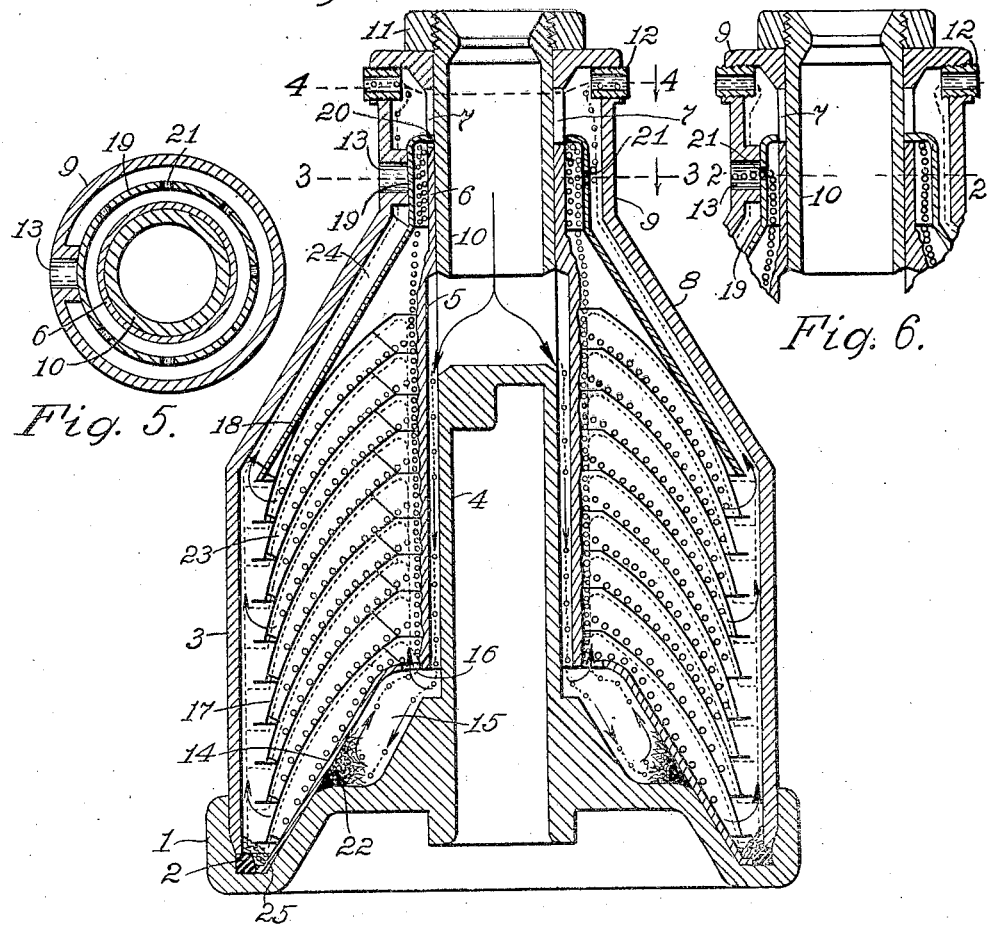

1,437,651

UNITED STATES PATENT OFFICE.

CHARLES H. HACKETT, OF CASTLE HILL, IOWA, ASSIGNOR TO WILBUR W. MARSH, OF WATERLOO, IOWA.

CONVERTIBLE CREAM SEPARATOR.

Application filed May 2, 1921. Serial No. 466,026.

*To all whom it may concern:*

Be it known that I, CHARLES H. HACKETT, a citizen of the United States of America, and a resident of Castle Hill, Blackhawk County, Iowa, have invented certain new and useful Improvements in Convertible Cream Separators, of which the following is a specification.

My invention relates to improvements in convertible cream separators, and the object of my improvement is to convert a centrifugal cream separator into a milk clarifying machine by means hereinafter explained.

Heretofore, the employment of both a centrifugal cream separator and a milk clarifier has been necessary, in order to either separate the cream from the milk, or to clarify the whole milk, if it was found desirable to do both.

My invention renders it unnecessary to purchase a clarifier, because by the use of very simple means this invention permits a milk clarifier to be made from a centrifugal cream separator, with a consequent saving.

The function of a centrifugal cream separator is to separate the cream from the milk, and to deliver cream and the skimmed milk separately.

The function of a centrifugal milk clarifier is to separate dirt and filth from the whole milk.

In my experiments, I learn that cream is delivered from a centrifugal cream separator bowl at a lower temperature than the temperature of the skimmed milk. This difference in temperature is due to the fact that cream is but a small fractional part of the whole milk and in the act of its expulsion from the bowl becomes more vaporized that the skimmed milk contacting with a larger cooling area of air, and also to the fact that the area of the cream-receiving pan is much larger proportionately in cooling effect upon the cream than the skimmed milk receiving pan.

My investigations have shown that it is impossible to secure a perfect emulsification of the cream and skimmed milk after they have been separately expelled from the bowl of a centrifugal cream separator. On the other hand, when the cream and skimmed milk are re-emulsified wholly within the bowl at the same temperature before delivery from the bowl as whole milk, the emulsification is perfectly accomplished.

The object of my invention has been accomplished by such mechanism as illustrated in the accompanying drawings, in which Fig. 1 is a vertical axial section of a well-known kind of centrifugal cream separator bowl as convertibly used as a milk clarifier; Fig. 2 is a horizontal section of the neck part of the bowl taken on the broken line 2—2 of Fig. 6; Fig. 3 is a horizontal section of said neck part taken on the broken line 3—3 of said Fig. 1; Fig. 4 is a horizontal section of said neck part taken on the broken line 4—4 of said Fig. 1; Fig. 5 is a similar section to that shown in said Fig. 3, but showing a modified form of the convertible dividing device, and Fig. 6 is a vertical axial section of the neck part of the bowl, showing said dividing device as re-converted to function as a cream and milk divider after use as shown in Fig. 1.

Similar numerals denote corresponding parts throughout the several views.

The hollow rotatable centrifugal cream separator bowl shown in said Fig. 1 comprises a basal part 1 having an outer concentric raised rim, with an upwardly-coned central part which is continued upwardly as a hollow cylinder 4, closed at the top, the upper septum-part of its hollow wall having engaging-means to co-engage with other engaging-means on the top of a received rotatable driving-shaft not shown. The bowl body 3 is a hollow cylinder with open bottom and lower edge resting upon and sealed by a rubber sealing-ring 2 within and fitting the rim of the basal part 1. The upper part of said bowl is coned at 8 the coned part having a coaxial upwardly extending hollow cylinder 9 whose open top has an inwardly flanged terminal. This cylindrical neck part 9 has a cream-exit 13, and has thereabove exits for the skimmed milk, being hollow screws 12 adjustable radially in threaded seats to permit varying the cream content of the skimmed milk in a well-known way.

The neck 9 around the cream-exit 13 is projected inwardly to engage detachably the abutting outer wall of a convertible dividing device 18—19.

The upper part 10 of the central structure 4 has, above said septum, lateral openings on opposite sides. These openings effect communication between the milk receiving hollows of said part 10 and a cylindrical interspace between a tube 5 which is mounted removably about the structure 4, with its upper part in contact with the outer wall of the part 10 above said openings. The upper edge of the part 6 is engaged by the inwardly directed top ring of the neck 9. A milk-tube 10 has its upper end extending above the neck 9, and is exteriorly threaded to receive a nut 11. The lower part of the milk-tube 6—5 is expanded downwardly to provide an open bottom hollow conical frustum 14 having at its apex openings 16. The bottom 1 of the bowl is concentrically stepped to provide conical frustums, and the lower part of the inner wall of the frustum 14 contacts with the lowermost of said stepped frusta. This arrangement provides a basal sludge separating and segregating chamber 15 in whose outer part the sludge or dirt and hair forms a deposit 22. Within the interior of the bowl 3 mounted in superposed relation concentrically about the tube 5 are a number of curved conical hollow frusta 17 having spacing-ribs 23, their lower edges spaced from the inner wall of the bowl and their upper edges spaced from said tube 5 to permit undisturbed passage upwardly respectively of the skimmed milk and of the separated cream. A hollow top cone 18 is superposed upon the uppermost frustum 17 and has a diminished cylindrical top part 19 rimmed inwardly about a central opening which rim has an inwardly extending segmental projection 20 receivable within either of oppositely located rectangular notches 7 in the upper edge of the tube 6. The cone 18 has spacing ribs 24 to space it from the adjacent coned part 8 of the bowl. The upper part 19 of the cone 18 has a lateral cream exit 21 which, when the device is employed as a cream separator, is in communication with said cream exit 13 in the bowl top 9 as shown in Fig. 2. When it is desired to use the device as a milk clarifier only, the cone 18 is replaced about the tube 6—5 with its projection 20 in the opposite notch 7 with its imperforate wall closing said cream exit 13 as shown in Fig. 3. with the opening 21 delivering into the hollow of the neck 9. When desired, to deliver the cream into the milk at several places, an extra part 18—19 may be used in replacement of the other, having openings 21 so that the re-emulsifying of the cream and milk wholly within the neck of the bowl is perfected. In either case, the dividing part 18—19 is shaped and constructed so as to coact in the bowl with it and the other elements in maintaining a perfect balance, which is absolutely necessary to ensure operativeness of the device in either function.

The part 18—19 having been placed properly to function in such a re-emulsification, the circulation as changed thereby, is diagrammatically indicated in Fig. 1, wherein mixed dots and circles denote whole milk, circles only cream, and dots only the separated or skimmed milk. The sludge is first segregated at 22, and semi-solid matters such as blood at 25, and thence the bowl operates to separate the cream and milk as thus clarified in the usual way. However, the collected cream in the closed top of the dividing device 18—19 is prevented from escaping through the now closed cream-exit 13, but is delivered at 21 outwardly into the skimmed milk in the neck of the bowl where it is mingled therewith and becomes completely re-emulsified therein before the delivery as clarified whole milk through the milk-exits 12.

The separation of the cream from the milk by centrifugal force during the rapid rotation of the bowl is inevitable while the sludge is being also separated and segregated by the same force. In my invention, such changes in the construction and adjustable reversals of parts of the liner are made as will recombine said separated cream and milk within the bowl before the delivery of the newly constituted or re-constituted whole milk by way of the milk exit only. It will be seen, therefore, that any suitable type of centrifugal liquid separator may be employed for this function when the necessary changes in construction or in relative positions of parts have been effected.

It is not herein claimed that my process and device are for a clarifying method and apparatus only, but it is for an application to secure clarification by a simple conversion of a part of a centrifugal cream separator, said part being returnable for use in its former mode.

Having described my invention, what I claim as new and desire to secure by Letters Patent, is:

1. In combination, a centrifugal cream separator bowl having an inlet for whole milk, and having a cream-outlet and a skimmed-milk outlet, and a liner within the bowl, said liner including a division-device between it and said outlets provided with a port normally in communication with said cream-outlet and not in communication with said skimmed-milk outlet, said division-device being changeable in relative position to place its said port out of communication with said cream-outlet while positioning the port to deliver separated cream into the separated skimmed-milk in the bowl to re-emulsify them before their delivery in a recombined state by way of said skimmed-milk outlet.

2. In combination, a centrifugal cream separator bowl having an inlet for whole milk, and having a cream-outlet and a skimmed-milk outlet, and a liner within said bowl, said liner having a separable division-device adjacent said outlets provided with a port not in communication with said cream-outlet, said port being in communication with the interior of the bowl adjacent to said skimmed-milk outlet and adapted to deliver separated cream into the separated skimmed-milk to re-emulsify them within the bowl antecedently to delivering them in recombination and in clarification from solid components by way of said skimmed-milk outlet.

Signed at Waterloo, Iowa, this 1st day of April, 1921.

CHARLES H. HACKETT.